(12) United States Patent
Pedani et al.

(10) Patent No.: US 9,469,360 B2
(45) Date of Patent: Oct. 18, 2016

(54) CONTROL CIRCUIT AND METHOD FOR AN LED EXTERNAL LIGHTING UNIT OF A VEHICLE

(71) Applicant: PIAGGIO & C. S.p.A., Pontedera (IT)

(72) Inventors: Giuseppe Pedani, Pontedera (IT); Yari Sanfelice, Pontedera (IT); Luigi Baracchino, Pontedera (IT)

(73) Assignee: Plaggio & C. S.P.A., Pontedera (IT)

( * ) Notice: Subject to any disclaimer, the term of this patent is extended or adjusted under 35 U.S.C. 154(b) by 0 days.

(21) Appl. No.: 14/786,832

(22) PCT Filed: Apr. 14, 2014

(86) PCT No.: PCT/EP2014/057518
§ 371 (c)(1),
(2) Date: Oct. 23, 2015

(87) PCT Pub. No.: WO2014/173718
PCT Pub. Date: Oct. 30, 2014

(65) Prior Publication Data
US 2016/0075391 A1    Mar. 17, 2016

(30) Foreign Application Priority Data

Apr. 24, 2013    (IT) .............................. RM2013A0247

(51) Int. Cl.
| | |
|---|---|
| *B62J 6/00* | (2006.01) |
| *H05B 33/08* | (2006.01) |
| *B60Q 1/14* | (2006.01) |
| *B60Q 11/00* | (2006.01) |
| *F21S 8/10* | (2006.01) |
| *B60Q 1/04* | (2006.01) |
| *B62J 6/02* | (2006.01) |

(52) U.S. Cl.
CPC ............... *B62J 6/001* (2013.01); *B60Q 1/04* (2013.01); *B60Q 1/143* (2013.01); *B60Q 11/005* (2013.01); *B62J 6/02* (2013.01); *F21S 48/115* (2013.01); *F21S 48/328* (2013.01); *H05B 33/089* (2013.01); *H05B 33/0848* (2013.01); *H05B 33/0854* (2013.01); *B60Q 2300/112* (2013.01); *B60Q 2300/146* (2013.01)

(58) Field of Classification Search
None
See application file for complete search history.

(56) References Cited

U.S. PATENT DOCUMENTS

2004/0178737 A1* 9/2004 Takeda ................. B60Q 1/00
                                                               315/77
2008/0157678 A1    7/2008 Ito et al.

FOREIGN PATENT DOCUMENTS

JP        2003 178602 A    6/2003

OTHER PUBLICATIONS

Search Report and Written Opinion dated May 23, 2014.

*Primary Examiner* — Dedei K Hammond
(74) *Attorney, Agent, or Firm* — Arent Fox LLP; Michael Fainberg

(57) ABSTRACT

The invention describes a control circuit for an LED external lighting unit of a vehicle, said lighting unit comprising at least an LED source and a passive heatsink. The control circuit comprises: a temperature sensor adapted to provide a first output signal carrying information about the operating temperature of the LED source and/or of the passive heatsink; a first output node operatively connectable to an optical and/or acoustic warning device and adapted to provide thereto a first control signal, depending upon the first output signal, adapted to produce an alarm warning through said warning device when said temperature is higher than a first threshold value; a driver unit being adapted to output an LED source driving signal, said driving signal being a relatively high-power signal or a relatively low-power signal.

14 Claims, 3 Drawing Sheets

CONTROL CIRCUIT AND METHOD FOR AN LED EXTERNAL LIGHTING UNIT OF A VEHICLE

CROSS-REFERENCE TO RELATED APPLICATION

This application is a National Stage entry of International Application No. International Application No. PCT/EP2014/057518 filed on Apr. 14, 2014, which claims priority to Italian Patent Application No. RM2013A000247, filed on Apr. 24, 2013. The disclosures of the priority applications are incorporated in their entirety herein by reference.

FIELD OF TECHNOLOGY

The present description refers to the technical field of lighting devices for vehicles and in particular concerns a control circuit and method for an LED external lighting unit of a vehicle.

BACKGROUND

As known, LED sources, particularly if powerful, need to be used at an operating temperature below their limit temperature, in order to avoid a reduction in the flow of optical radiation emitted or even breaking of the sources themselves. For this purpose it is necessary for the junction temperature of the LED source to be kept below a predetermined limit value.

In order to keep the operating temperature of an LED source down, it is known to associate with the latter one or more passive heatsinks. In this case, the operating temperature of the LED source depends both on the current absorbed by it and on the amount of heat removed by the heatsink. For this last reason it is particularly tricky to control the temperature of an LED source of an external lighting unit of a vehicle, since the amount of heat removed by the heatsink depends on numerous external factors while the junction temperature of the LED source needs to be kept below a limit temperature irrespective of the external environmental conditions or other conditions that can in some way influence the efficiency of the heatsink. In a vehicle, the efficiency of the heatsink is for example significantly influenced by the environmental temperature, by the presence and by the features of an airflow that hits the heatsink (which depends greatly on the speed of the vehicle in the case in which the lighting unit is a front lighting unit), by the presence of external heat sources, like for example direct solar radiation.

In order to avoid overheating of the LED source irrespectively of the aforementioned external factors, it would be necessary to provide a large heatsink that can ensure correct and sufficient dissipation even when the air flow that hits it is practically zero, a condition that occurs for example in the case in which the vehicle is stopped. However, this would greatly influence the bulk and cost of the lighting unit. Some front headlights of vehicles of the state of the art are equipped with a dedicated cooling fan and a temperature sensor, so that it is possible to reduce the operating temperature when required. This solution, whilst reducing the dimensions of the heatsink, has the drawback of resulting in an increase in costs and power consumption.

SUMMARY

A general purpose of the present description is to provide a control circuit for an LED external lighting unit of a vehicle that is able to avoid the drawbacks described above with reference to the state of the art.

This and other purposes are achieved through a control circuit as defined in claim 1 in its most general form, and in the claims dependent on it in some particularly embodiments thereof.

BRIEF DESCRIPTION OF THE DRAWINGS

The invention will become clearer from the following detailed description of embodiments thereof, given as an example and therefore in no way limiting, with reference to the attached drawings, in which.

DETAILED DESCRIPTION

Figure 1:
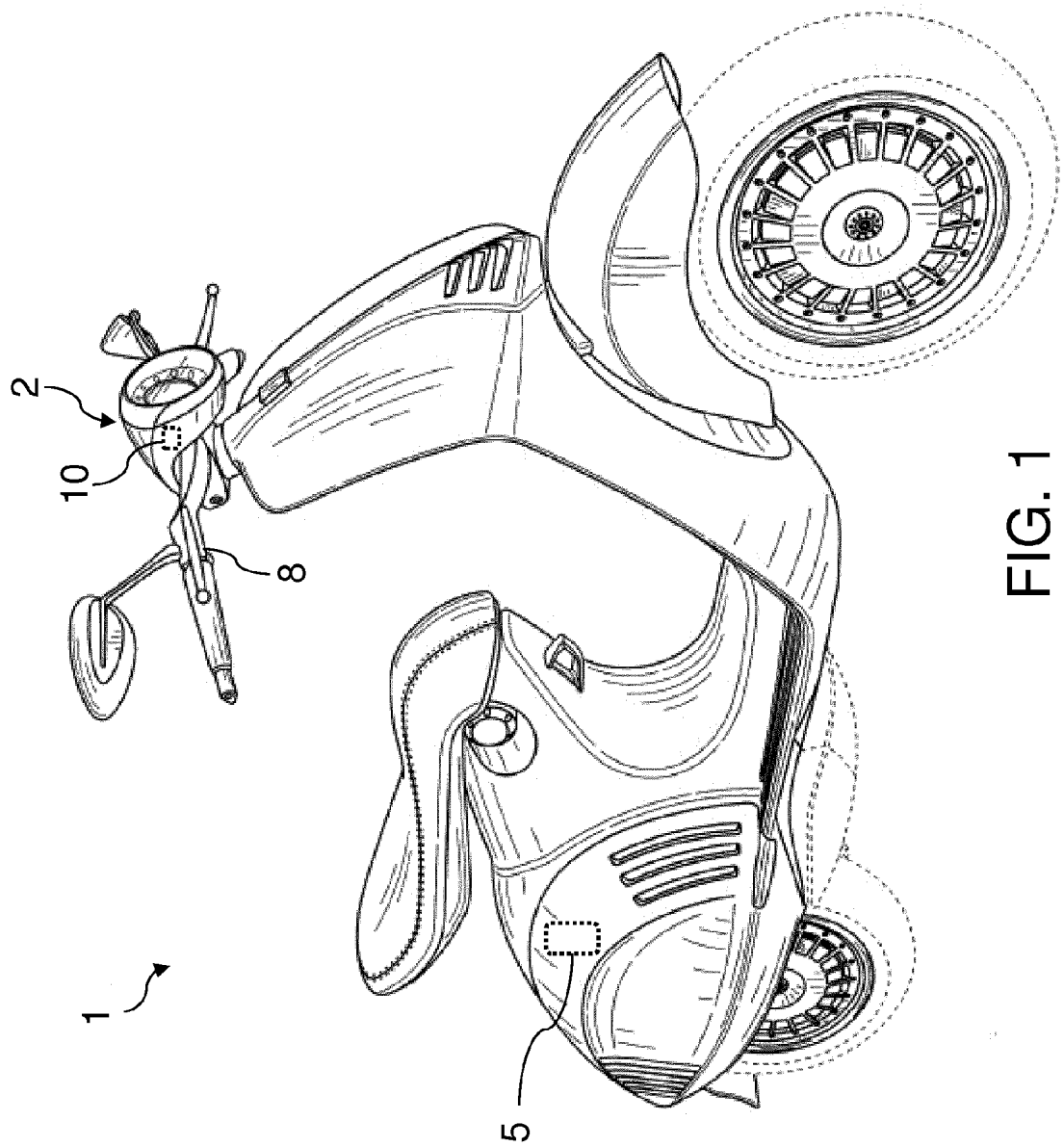
FIG. 1 shows a schematic view of an embodiment of a vehicle comprising an LED external lighting unit and a control system comprising a control circuit of said lighting unit.

In the attached figures elements that are the same or similar will be indicated with the same reference numerals.

FIG. 1 shows an embodiment of a vehicle 1, which in the example represented is in the form of a motorcycle and in particular a motor scooter. The vehicle 1 comprises an LED external lighting unit 2 and a control circuit 10 of the LED external lighting unit 2. In accordance with an embodiment the vehicle 1 comprises a control system 5, 10 comprising a processing unit 5 and the aforementioned control circuit 10, in which said pieces 5,10 are operatively connected to one another. In accordance with an embodiment, the processing unit 5 constitutes the electronic control unit ECU (FIG. 2) of the vehicle 1. Such a control unit 5 is able to acquire direct or indirect information on the speed of the vehicle 1, being connected to a motion sensor 25 of the vehicle itself. The motion sensor 25 is for example a speedometer and in this case the information acquired is direct speed information. Alternatively, in the case in which the vehicle 1 is a motor vehicle with CVT (Continuously Variable Transmission) the motion sensor 25 is a rev counter, already conventionally connected to the processing unit 5 for other reasons related to the control of the vehicle 1. In this case the information acquired is indirect speed information. It should be considered that, even irrespective of the type of transmission of the vehicle 1, it is possible to foresee for the control unit 5 to be connected to the speedometer of the vehicle 1 or to the rev counter of the vehicle 1 or even to both.

Figure 2:
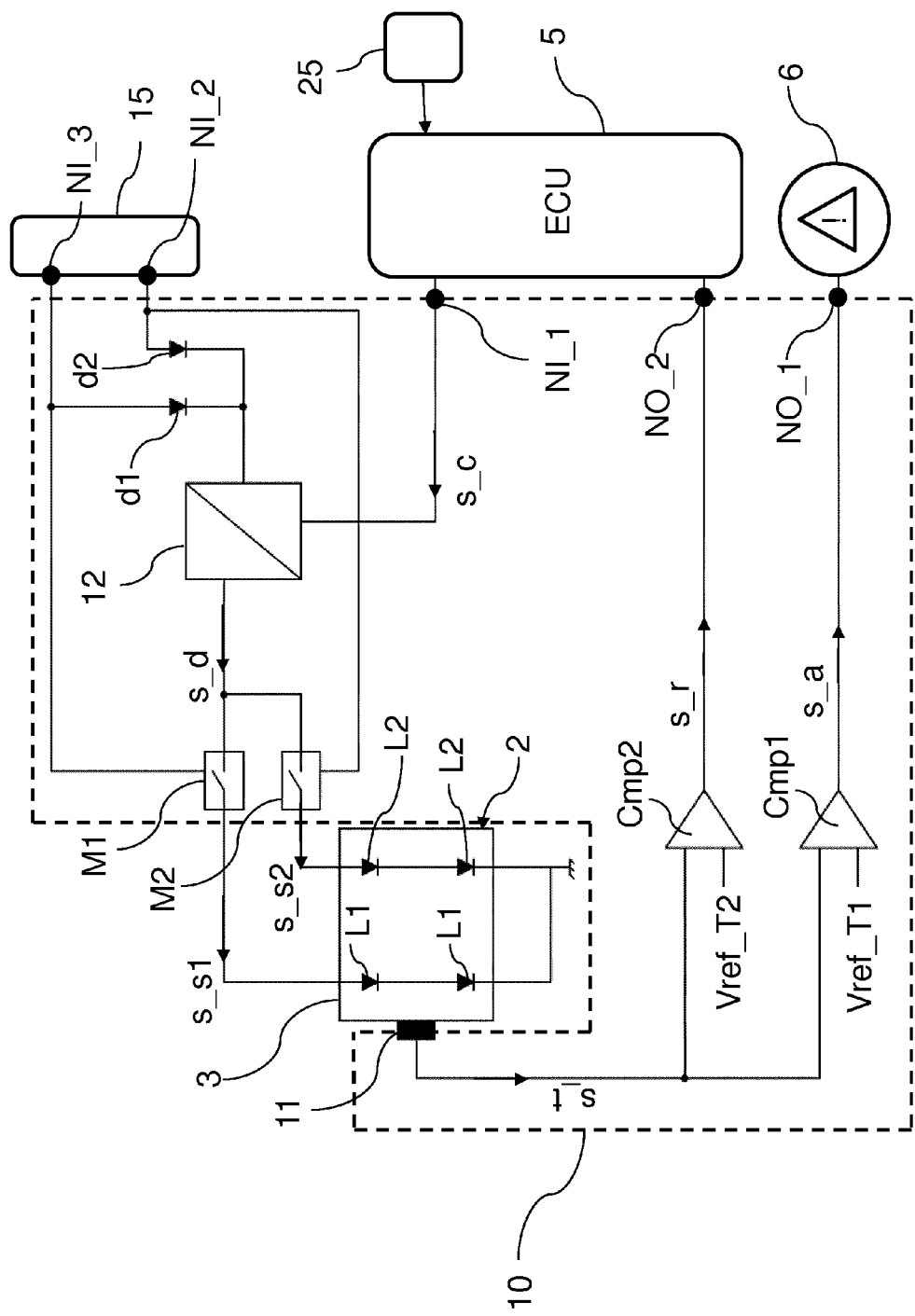
FIG. 2 shows an example block diagram of the control system of FIG. 1.

Preferably, the LED external lighting unit 2 comprises a casing that contains a reflector, a screen and at least one LED optical source L1, L2 (FIG. 2). Preferably, the control circuit 10 is housed inside the aforementioned casing. In the particular example represented the LED external lighting unit 2 is in the form of an LED front headlight of the vehicle having selectively or jointly the function of producing in output a high and a dipped optical beam.

With reference to FIG. 2, the LED external lighting unit 2 comprises a passive heatsink 3. The latter preferably has relatively small dimensions so as to be adapted to be at least partially housed in the casing of the LED external lighting device 2. Preferably, the LED source L1, L2 comprises a first source L1, which by cooperating with the reflector is adapted to produce in output a dipped optical beam, and a second source L2, which by cooperating with the reflector is adapted to produce in output a high optical beam. Preferably, both the first L1 and the second L2 LED source each comprise a pair of LED diodes electrically connected together in series. Preferably, said LED diodes are power LED diodes, for example each having an operating power equal to about 11 W. The first L1 and the second L2 LED source can be the same as each other, but arranged in different positions with respect to the reflector, or they can be different to each other.

The control circuit 10 comprises a temperature sensor 11 adapted to provide a first output signal s_t carrying temperature information relating to the operating temperature of the LED source L1,L2 and/or of the passive heatsink 3.

In accordance with an embodiment the aforementioned temperature sensor 11 is in contact with the passive heatsink 3. The passive heatsink 3 is in contact with the LED source L1, L2. It should be observed that for the aforementioned reasons the temperature sensor 11 is such as to detect the operating temperature of the heatsink 3, which is however linked to the operating temperature of the LED source L1, L2 by a transfer function. The first output signal s_t therefore carries information on the operating temperature of the heatsink 3 and therefore information related, through the aforementioned transfer function able to be determined experimentally and/or analytically, to the operating temperature of the LED source L1,L2. It should be observed that the operating temperature of the LED source is the so-called junction temperature of the LED source. The LED source has a case that by conduction is such as to be able to transfer heat, directly or indirectly, to the heatsink 3. The temperature of the case is an intermediate temperature between the junction temperature and the temperature of the heatsink 3. For example, between the temperature of the heatsink 3 and the junction temperature of the LED there is a difference of about 30° C. (for example equal to 32° C.) whereas between the temperature of the heatsink and that of the case there is a difference of about 10° C.

In accordance with an embodiment, the temperature sensor 11 is preferably a NTC (Negative Temperature Coefficient) thermistor or a PTC (Positive Temperature Coefficient) thermistor applied, for example glued, to a surface portion of the passive heatsink 3.

The control circuit 10 comprises a first output node NO_1 operatively connected or connectable to an optical and/or acoustic warning device 6 and adapted to provide thereto a first control signal s_a, depending upon the first output signal s_t. The first control signal s_a is adapted to produce an alarm warning through the aforementioned optical and/or acoustic warning device 6, which can be used by the driver of the vehicle 1, when the temperature (operating, i.e. junction, of the LED source L1, L2 or of the case of the LED source or of the passive heatsink) is above a first threshold value T1. Henceforth for the sake of simplicity when we refer to the term operating temperature we mean, without for this reason introducing any limitation, the temperature of the passive heatsink 3. For the purposes of the present description by first threshold value T1 we therefore mean a value defined on the operating temperature of the passive heatsink 3. In accordance with an embodiment, said first threshold value T1 is equal to about 75° C.

In accordance with an embodiment, the optical and/or acoustic warning device 6 is arranged in the control board of the vehicle 1, being for example an optical warning device in the form of a dedicated indicator light or a generic display adapted to display the aforementioned alarm warning. In accordance with an alternative or additional embodiment, the optical and/or acoustic warning device 6, is integrated in a personal communication device, like for example a smartphone, operatively connectable or connected to the vehicle 1, for example connected or connectable wirelessly to the processing unit 5. As represented in FIG. 2, according to a preferred embodiment the warning device 6 is a different device with respect said LED source of the external lighting unit L1, L2 even if it can be, or include, another LED device for example placed in the control board of the vehicle directed towards the driver.

In accordance with an embodiment, the first control signal s_a is a logic signal, adapted to take up at least two logic levels (for example "0" and "1"). The control circuit 10 for example comprises a first comparator Cmp1 adapted to compare the voltage of the first output signal s_t with a reference voltage threshold Vref_T1 corresponding to the first threshold value T1, to supply in output the first control signal s_a adapted to take up a first level (normal level) when the temperature detected by the sensor 11 (i.e. in the described example the operating temperature of the heatsink 3) is less than or equal to the first threshold value T1 and a second level (alarm level) when the temperature detected by the sensor 11 is higher than the first threshold value. In an alternative embodiment, the first output node NO_1 could be supplied directly with the first output signal s_t, and in this case the optical and/or acoustic warning device 6 is assigned the function of discriminating whether the temperature detected by the temperature sensor 11 is above the first threshold value T1.

The control circuit 10 comprises a driver unit 12 of the LED source L1,L2 comprising a first input node NI_1 adapted to receive a second control signal s_c, depending upon the speed of the vehicle and upon the first output signal s_t. In accordance with an embodiment the second control signal s_c is supplied to a first input node NI_1 of the control circuit 10 by the processing unit 5.

The driver unit 12 is such as to supply in output a relatively high-power or relatively low-power driving signal s_d of the LED source L1,L2 according to the second control signal s_c.

In accordance with an embodiment, the driver unit 12 is such as to supply in output the relatively high-power or relatively low-power driving signal s_d according to the second control signal s_c so that, when the temperature detected by the temperature sensor 11 is above a second threshold value T2:

the relatively high-power driving signal s_d is provided in output if the speed of the vehicle 1 is above a threshold speed;

the relatively low-power driving signal s_d is provided in output if the speed of the vehicle 1 is less than or equal to the threshold speed.

In accordance with an embodiment, the driver unit 12 is such that the transitions of the driving signal s_d from relatively high power to relatively low power and vice-versa take place gradually, for example over a predetermined time period preferably comprised between 3 seconds and 10 seconds and preferably equal to about 4 or 5 seconds.

In accordance with an embodiment, the control circuit 10 comprises a second output node NO_2 operatively connected or connectable to the processing unit 5. The control circuit 10 is such as to provide such a second output node NO_2 with the first output signal or a third control signal s_r obtained from it. For example, in an analogous way to what has already been described for the first control signal s_a, the third control signal s_r is also a logic signal, adapted to take up at least two logic levels. The control circuit 10 comprises for example a second comparator Cmp2 adapted to compare the voltage of the first output signal s_t with a reference voltage threshold Vref_T2 corresponding to the second threshold value T2, to supply in output the third control signal s_r adapted to take up a first level (normal level) when the temperature detected by the sensor 11 is less than or equal to the second threshold value T2 and a second level (alarm level) when the temperature detected by the sensor 11 is greater than the second threshold value T2. In an alternative embodiment, the second output node NO_2 could be supplied directly with the first output signal s_t, and in this case the processing unit 5 is assigned the function of discriminating whether the temperature detected by the sensor 11 is above the second threshold value T2.

In accordance with an embodiment, the second threshold value T2 is higher than the first threshold value T1, there being a maximum difference of 10° C. and preferably a difference of, or roughly equal to, 5° C. between the two values.

In accordance with an embodiment, the aforementioned threshold speed is equal to zero km/h or about equal to zero km/h, for example equal to a maximum of about 5 km/h. This means that the driver unit 12 is such as to provide the LED source L1, L2 with the relatively low-power driving signal s_d when the vehicle 1 is stopped or is substantially stopped.

In accordance with an embodiment, the high power driving signal s_d is a direct current driving signal and the low-power driving signal s_d is a Pulse Width Modulated signal (PWM signal). According to an embodiment both the direct current high power driving signal and the low power Pulse Width Modulated driving signal are such as to still take the LED source L1, L2 into a switched on state in which said LED source emits its nominal power (i.e. it is switched on to the "maximum" tolerable in normal operating conditions based on the operating specifications of the same source).

According to a preferred embodiment, the PWM driving signal has a duty cycle comprised between 20% and 60%. Preferably, the duty cycle is equal to 40%. In accordance with an embodiment said duty cycle is constant and has a value that is predetermined at the design and production stage. In accordance with an alternative embodiment such a duty cycle can be adaptively varied during operation based on a control carried out from the temperature information detected by the sensor 11 and/or based on the information acquired relating to the speed of the vehicle 1.

In accordance with an embodiment, the frequency of the PWM driving signal is greater than 50 Hz, preferably comprised in the range 100 Hz-1 kHz and more preferably 100 HZ-300 Hz and more preferably equal to 200 Hz.

In accordance with an embodiment, the driver unit 12 is a DC/DC converter controlled by the second control signal s_c. For example, the second control signal s_c is a signal adapted to determine the turning on and off, i.e. a so-called "enable" signal, of the DC/DC converter 12. For this reason:

in order to produce the relatively high-power driving signal s_d the second control signal s_c is a direct current signal adapted to keep the DC/DC converter 12 switched on; and in order to produce the relatively low-power driving signal s_d the second control signal s_c is a PWM signal adapted to switch the DC/DC converter 12 on and off repeatedly in sequence.

In the aforementioned embodiment, it can be worked out that the driving signal s_d is also a direct current signal or a PWM signal based on the control signal s_c.

With reference to FIG. 2, the diodes d1 and d2 represent power supply diodes of the DC/DC converter.

In accordance with an embodiment, the driving signal s_d is such as to drive a power stage M1, M2, comprised in the control circuit 10, adapted to supply a power supply signal s_s1, s_s2 to the LED source L1, L2. The aforementioned power stage preferably comprises an electronic switch M1, M2, for example a power MOS, controlled in conduction or turn off by the driving signal s_d. In the particular example represented, since there is at least one LED source L1 to produce a dipped optical beam and at least one LED source L2 to produce a high optical beam, there are two power stages M1, M2 both controlled on and off by the driving signal s_d and enabled alternatively or jointly based on selection signals received through two input nodes N_I2 and N_I3 of the control circuit 10, which are for example connected to a mode selection switch 15 of the beam (high/dipped beam) adapted to be commanded by the driver and, for example, arranged in a conventional manner on the handlebars 8 of the vehicle 1.

Figure 3:
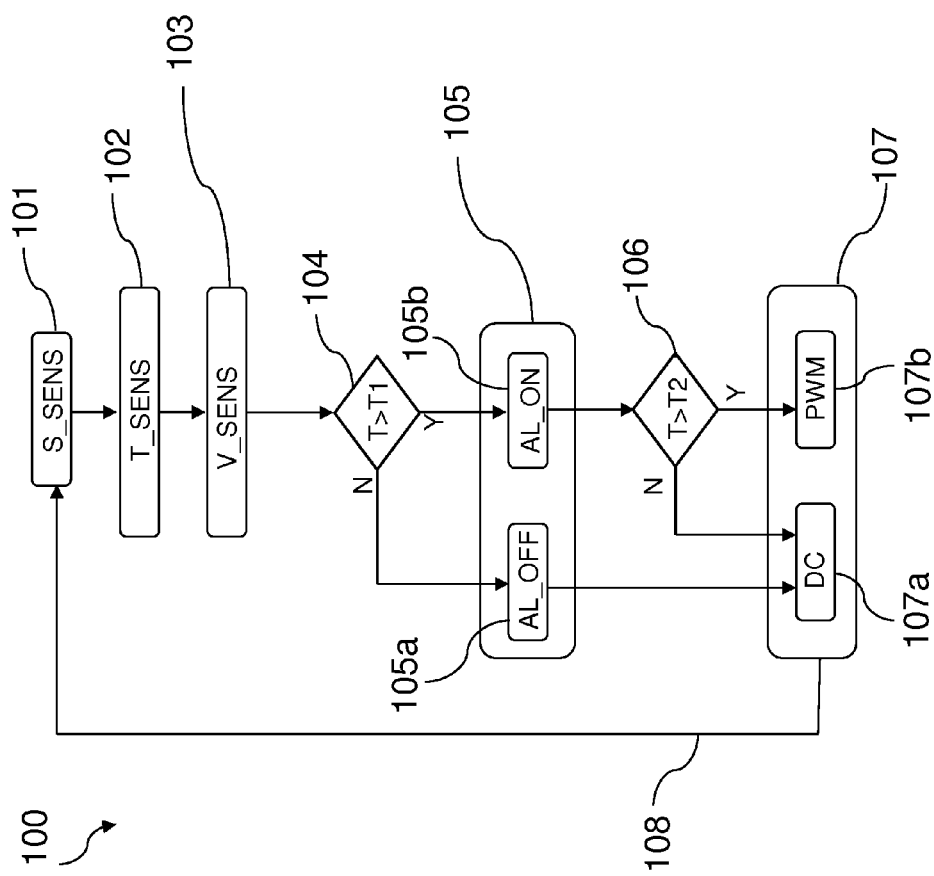
FIG. 3 shows the flow chart of an embodiment of a control method of an LED external lighting unit of a vehicle.

With reference to FIG. 3, it should be observed that the description made above for the control circuit 10 corresponds to the description of a control method 100 of an external lighting unit LED 2 of a vehicle 1, the external lighting unit 2 comprising at least an LED source L1,L2 and a passive heatsink 3. The control method 100 preferably comprises an initial step 101 (S_SENS) of detecting a switched on state of the engine of the vehicle 1. The detection of said switched on state is such as to lead to the subsequent steps of the control method 100.

The control method 100 comprises the steps of: acquiring 102 (T_SENS) information related to the operating temperature of the LED source L1,L2 and/or of the passive heatsink 3;

acquiring 103 (V_SENS) information related to the speed of the vehicle 1;

comparing 104 said information acquired relating to the operating temperature of the LED source L1,L2 and/or of the heatsink 3 to detect whether said operating temperature is higher than a first threshold value T1;

producing 105b an alarm warning through an optical and/or acoustic warning device 6 when said temperature is higher than the first threshold value T1. Vice-versa, when the aforementioned temperature is less than or at most equal to the first threshold value T1 in step 105 it is also preferably foreseen for there to be a step of producing 105a (AL_OFF) a normal operation indication, or of not producing any indication through the warning device 6. For example, the alarm warning corresponds to a coloured light (for example red or orange in colour) turning on the control panel of the vehicle 1 whereas the indication of normal operation corresponds to said light being turned off.

The method 100 also comprises a step of driving 107 the LED source L1, L2 according to information related to the operating temperature of the LED source L1,L2 and/or of the heatsink 3 and information regarding the speed of the vehicle 1, driving the LED source L1,L2 with a relatively high-power or relatively low-power driving signal s_d according to the speed of the vehicle and the temperature detected.

In accordance with an embodiment, the method 100 comprises a step of comparing 106 said information acquired relating to the operating temperature of the LED source L1,L2 and/or of the heatsink to detect whether said operating temperature is higher than a second threshold value T2 and in said driving step 107:

a step of driving 107a (DC) the LED source L1, L2 with the relatively high-power driving signal s_d is carried out if the speed of the vehicle 1 is above a threshold speed;

a step of driving 107b (PWM) the LED source L1, L2 with a relatively low-power driving signal s_d is carried out if the speed of the vehicle 1 is less than or equal to the threshold speed.

As indicated by the arrow 108 in FIG. 3, the aforementioned steps 101-107 of the control method 100 are repeated iteratively until, through step 101, it is detected that the engine of the vehicle 1 is in the switched on state.

The other characteristics of the control method 100 can be directly obtained from the detailed description made above in relation to the control circuit 10.

Based on what has been described above it is therefore possible to understand how a control circuit and method of the type described above make it possible to achieve the purposes quoted above with reference to the state of the art. Through the control circuit and method it is possible to quickly inform the driver of the vehicle of an anomaly linked to a first temperature threshold value TI being exceeded. This, for example, could happen if there were obstacles to ventilation (like for example an object or an accessory) arranged at the LED external lighting unit 2 and that can be quickly removed following the alarm warning (consider for example an item of clothing laid over the lighting device 10). The alarm warning also allows the driver to be made aware of anomalies (like for example the accumulation of dirt such as dust, leaves, cobwebs) that require maintenance of the LED lighting unit 2. Moreover, once the second threshold value T2 has been exceeded, if the speed conditions allow, it is possible to actively intervene on the power dissipated by driving the LED source L1, L2 with a low power driving signal with the goal of taking the operating temperature of the LED source back below the second threshold value T2.

Without affecting the principle of the invention, the embodiments and the details can be varied greatly with respect to what has been described and illustrated purely as a non-limiting example, without for this reason departing from the scope of protection of the invention as defined in the attached claims.

The invention claimed is:

1. A control circuit for a LED external lighting unit of a vehicle, said lighting unit comprising at least a LED source and a passive heatsink, wherein the control circuit comprises:
 a temperature sensor adapted to provide a first output signal carrying information about the operating temperature of at least one of the LED source and the passive heatsink;
 a first output node operatively connectable to at least one of an optical and acoustic warning device and adapted to provide thereto a first control signal depending upon the first output signal, adapted for generating an alarm warning through said warning device when said temperature is higher than a first threshold value;
 a driver unit of the LED source comprising a first input node adapted to receive a second control signal, depending upon the speed of the vehicle and the first output signal, the driver unit being adapted to output a LED source driving signal, said driving signal being a relatively high-power driving signal or a relatively low-power driving signal according to the second control signal,
 wherein the high-power driving signal is a direct current driving signal and wherein the low-power driving signal is a Pulse Width Modulated signal (PWM signal).

2. The control circuit according to claim 1, wherein the driver unit is configured to output the relatively high-power or relatively low-power driving signal according to the second control signal so that, when said operating temperature is higher than a second threshold value:
 the relatively high-power driving signal is output if the speed of the vehicle is higher than a threshold speed;
 the relatively low-power driving signal is output if the speed of the vehicle is lower or equal to the threshold speed.

3. The control circuit according to claim 2, wherein said second threshold value is higher than the first threshold value.

4. The control circuit according to claim 2, wherein the threshold speed is equal to 0 Km/h.

5. The control circuit according to claim 1, wherein the PWM signal has a duty cycle between 20% and 60%.

6. The control circuit according to claim 5, wherein the duty cycle is 40%.

7. The control circuit according to claim 1, wherein the driver unit is a DC/DC converter.

8. The control circuit according to claim 1, wherein said warning device is a different device with respect to said LED source of the external lighting unit of said vehicle.

9. The control circuit according to claim 1, further comprising an electronic control unit of the vehicle adapted to obtain information regarding the speed of the vehicle and operatively connected to the control circuit so that:
 the electronic control unit is adapted to:
  receive as input the first output signal or a signal obtained therefrom, to receive said information related to the operating temperature of at least one of the LED source and the heatsink;
  synthesize the second control signal according to the information related to the speed of the vehicle and to said information related to the operating temperature; and
 provide the second control signal to the driver unit.

10. An LED head-light for a motorcycle comprising:
 a control circuit comprising:
  a temperature sensor adapted to provide a first output signal carrying information about the operating temperature of at least one of an LED source and a passive heatsink;
  a first output node operatively connectable to at least one of an optical and acoustic warning device and adapted to provide thereto a first control signal depending upon the first output signal, adapted for generating an alarm warning through said warning device-when said temperature is higher than a first threshold value;
  a driver unit of the LED source comprising a first input node adapted to receive a second control signal, depending upon the speed of the vehicle and the first output signal, the driver unit being adapted to output a LED source driving signal, said driving signal being a relatively high-power driving signal or a relatively low-power driving signal according to the second control signal, with the high-power driving signal being a direct current driving signal and the low-power driving signal being a Pulse Width Modulated signal (PWM signal); and
 an external lighting unit connectable to the driver unit and adapted to receive the LED source driving signal.

11. A system for a motorcycle comprising:
a control circuit comprising:
- a temperature sensor adapted to provide a first output signal carrying information about the operating temperature of at least one of an LED source and a passive heatsink;
- a first output node operatively connectable to at least one of an optical and acoustic warning device and adapted to provide thereto a first control signal depending upon the first output signal, adapted for generating an alarm warning through said warning device-when said temperature is higher than a first threshold value; and
- a driver unit of the LED source comprising a first input node adapted to receive a second control signal, depending upon the speed of the vehicle and the first output signal, the driver unit being adapted to output a LED source driving signal, said driving signal being a relatively high-power driving signal or a relatively low-power driving signal according to the second control signal, with the high-power driving signal being a direct current driving signal and the low-power driving signal being a Pulse Width Modulated signal (PWM signal);

a control system comprising:
an electronic control unit adapted to:
- receive as input the first output signal or a signal obtained therefrom, to receive said information related to the operating temperature of at least one of the LED source and the heatsink;
- synthesize the second control signal according to the information related to the speed of the vehicle and to said information related to the operating temperature; and
- provide the second control signal to the driver unit; and a LED headlight connected to the driver unit and adapted to receive the LED source driving signal.

12. A control method for a LED external lighting unit of a vehicle, the LED external lighting unit comprising at least a LED source and a passive heatsink, the control method comprising:
- obtaining information related to the operating temperature of at least one of the LED source and the passive heatsink;
- obtaining information related to the speed of the vehicle;
- comparing said obtained information regarding the operating temperature of at least one of the LED source and the passive heatsink to detect whether said operative temperature is higher than a first threshold value;
- generating an alarm warning through a warning device when said operating temperature is higher than a first threshold value;
- driving the LED source according to the information related to the speed of the vehicle and the information related to the operating temperature of at least one of the LED source and the passive heatsink, driving the LED source with a relatively high-power or relatively low-power driving signal according to said information, with the high-power driving signal being a direct current driving signal and the low-power driving signal being a Pulse Width Modulated signal (PWM signal).

13. The control method according to claim 12, further comprising comparing said obtained information related to the operating temperature of the LED source with a second threshold value, in order to detect whether said operating temperature is higher than the second threshold value and said driving step further comprises:
- driving the LED source with a relatively high-power driving signal if the speed of the vehicle is higher than a threshold speed;
- driving the LED source with a relatively low-power driving signal if the speed of the vehicle is lower than a threshold speed.

14. The control method according to claim 12, wherein said warning device is a different device with respect said LED source of the external lighting unit of said vehicle.

* * * * *